United States Patent [19]

Ling et al.

[11] Patent Number: 5,619,524
[45] Date of Patent: Apr. 8, 1997

[54] METHOD AND APPARATUS FOR COHERENT COMMUNICATION RECEPTION IN A SPREAD-SPECTRUM COMMUNICATION SYSTEM

[75] Inventors: Fuyun Ling, Hoffman Estates; Thomas A. Sexton, Schaumburg; Gene Bruckert, Arlington Heights, all of Ill.

[73] Assignee: Motorola, Inc., Schaumburg, Ill.

[21] Appl. No.: 396,453

[22] Filed: Feb. 28, 1995

Related U.S. Application Data

[63] Continuation-in-part of Ser. No. 317,501, Oct. 4, 1994.
[51] Int. Cl.$^6$ ............................... H04K 1/00; H04B 1/66
[52] U.S. Cl. ............................ 375/200; 375/377
[58] Field of Search ................. 375/208, 206, 375/200, 340, 343, 362, 365, 366, 377, 225, 334, 355, 205; 370/84, 105.1, 105.4, 106, 18, 19, 22, 100.1, 101; 327/164

[56] References Cited

U.S. PATENT DOCUMENTS

| | | | |
|---|---|---|---|
| 5,103,459 | 4/1992 | Gilhousen et al. | 375/208 |
| 5,309,474 | 5/1994 | Gilhousen et al. | 375/208 |
| 5,329,547 | 7/1994 | Ling | 375/206 |
| 5,361,276 | 11/1994 | Subramanian | 375/208 |
| 5,396,516 | 3/1995 | Padorani et al. | 375/225 |
| 5,412,686 | 5/1995 | Ling | 375/200 |
| 5,428,647 | 6/1995 | Rasku et al. | 375/366 |

OTHER PUBLICATIONS

G. Irvine and P. McLane, "Symbol–Aided Plus Decision–Directed Reception for PSK/TCM Modulation on Shadowed Mobile Satellite Fading Channels," IEEE Journal on Sel. Areas. in Com, vol. 10, No. 8, Oct. 1992, pp. 1289–1299.

A. Kajiwara, "On Synchronous CDMA for Mobile Communications," (Globecom '92?), pp. 858–862.

C. D'Amours, M. Moher, A. Yongacoglu, J. Wang, "RAKE Receiver Structures for Differential and Pilot Symbol–Assisted Detection of DS–CDMA Signals in Frequency–Selective Rayleigh Fading Channels," Globecom '93, pp. 1798–1802.

F. Ling, "Coherent Detection with Reference–Symbol Based Channel Estimation for Direct Sequence CDMA Uplink Communications," VTC '93, pp. 400–403.

R. Pedovani, "Reverse Link Performance of IS–95 Based Cellular Systems," IEEE Communications, 3Q94.

G. Brismark, M. Ewerbring, T. Sandin and P. Teder, "A Coherent Detection Scheme for the Uplink Channel in a CDMA System," VTC '94, pp. 729–732.

*Primary Examiner*—Tesfaldet Bocure
*Attorney, Agent, or Firm*—Richard A. Sonnentag; Kevin A. Buford

[57] ABSTRACT

A method and apparatus is provided for facilitating coherent communication reception. A received reference symbol coded spread spectrum communication signal is despread with a spreading code to derive a stream of reference samples and a stream of data samples. The channel response is estimated by utilizing the stream of reference samples. An offset frequency detector determines an offset to be applied to the received signal via a frequency locked loop, while a timing control compensates for slow timing drift and fast fading based on power estimates derived from the stream of reference samples and/or the stream of data samples. A rate estimator determines the rate at which the information was encoded, and the rate information is used to optimize the timing control, frequency offset detector and channel estimator. Thus an improved detection of estimated data symbols from the stream of received data samples is provided.

17 Claims, 10 Drawing Sheets

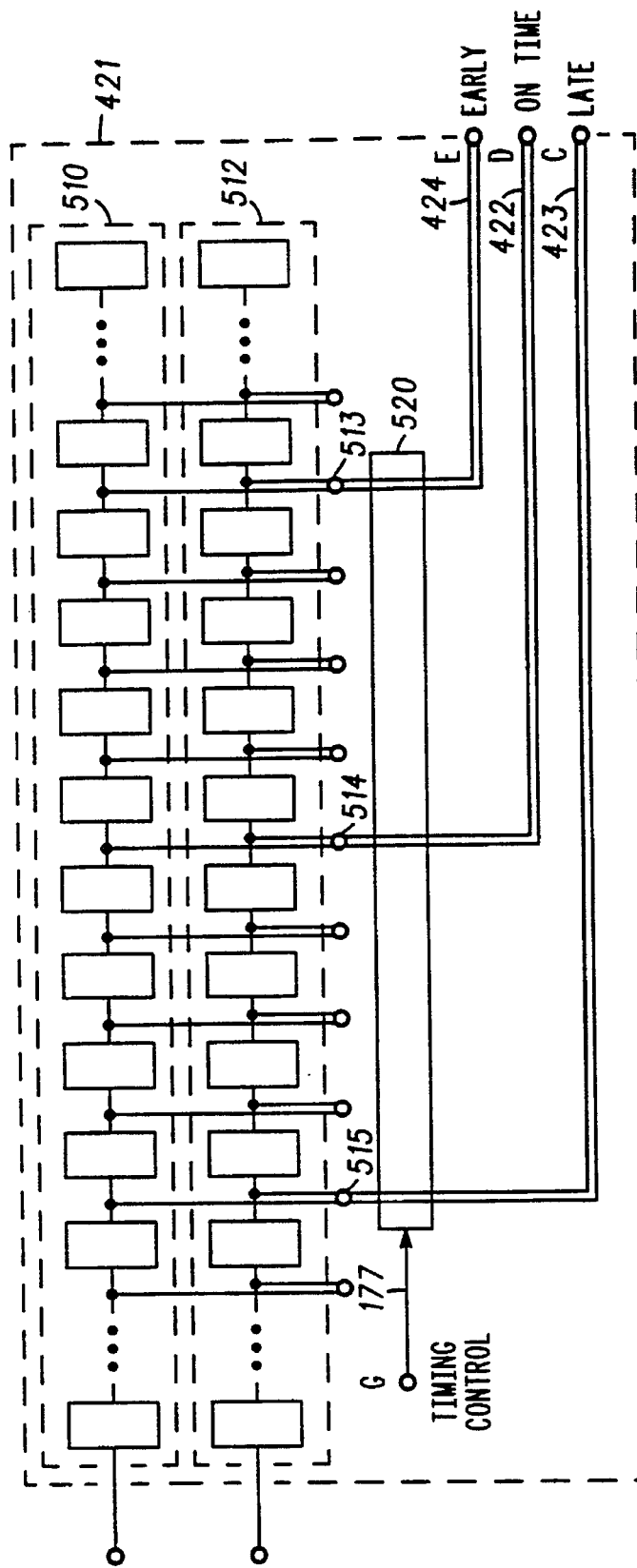
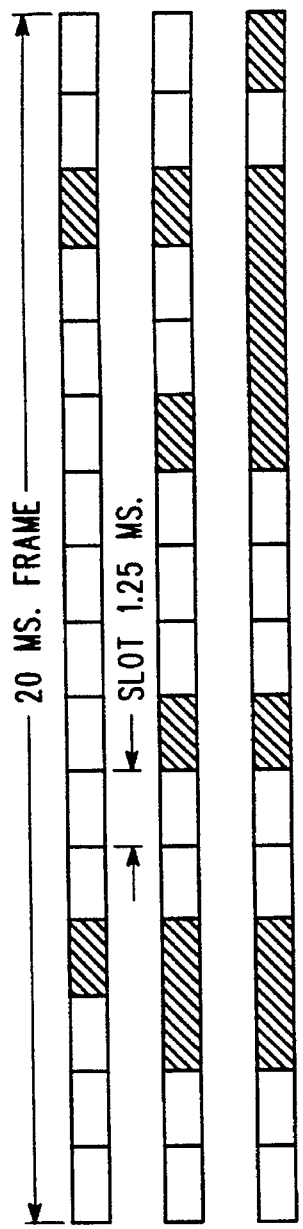
FIG. 6
FIG. 8

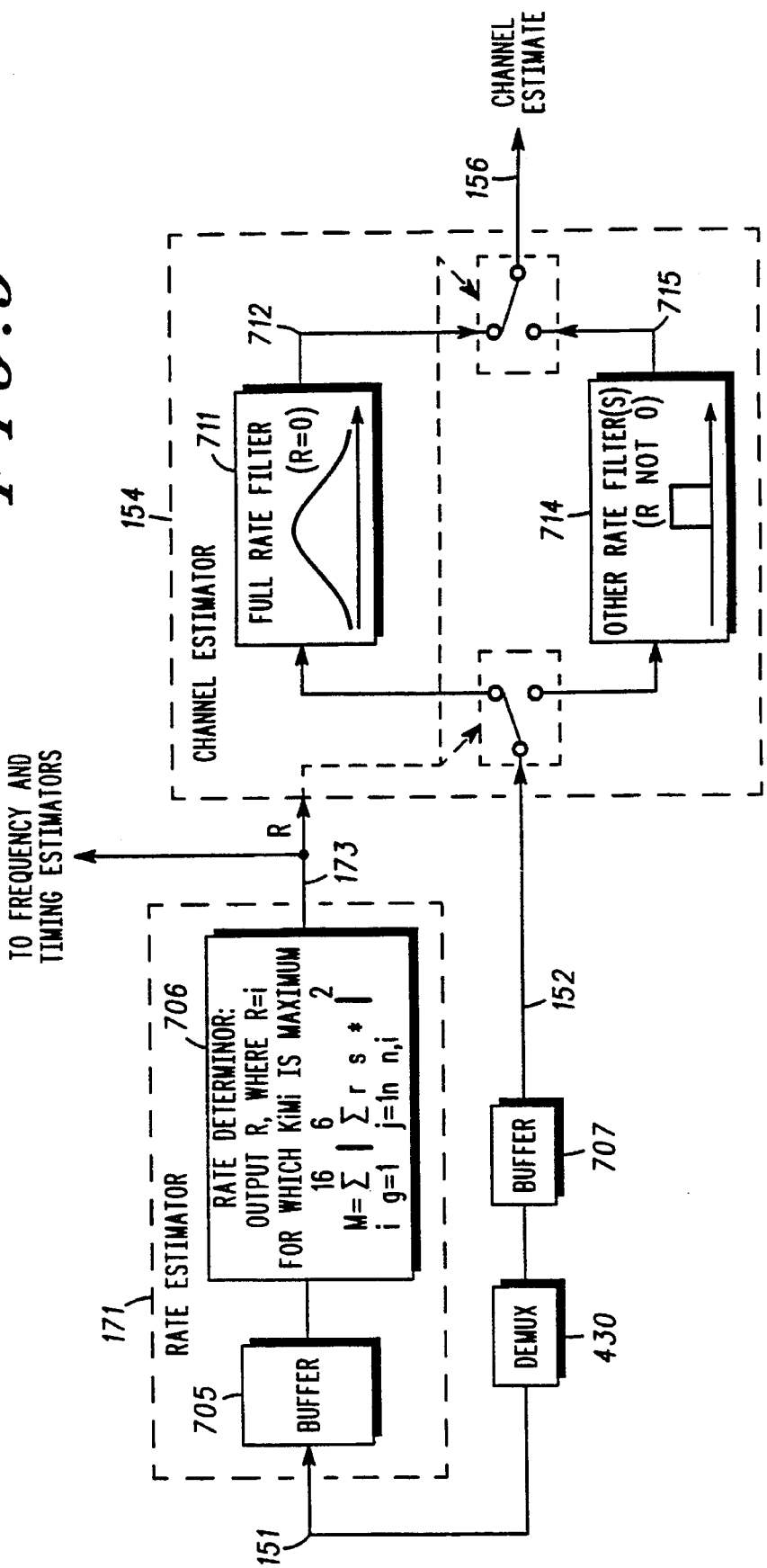

5,619,524

METHOD AND APPARATUS FOR COHERENT COMMUNICATION RECEPTION IN A SPREAD-SPECTRUM COMMUNICATION SYSTEM

This application is a continuation-in-part of U.S. application Ser. No. 08/317,501, filed Oct. 4, 1994.

FIELD OF THE INVENTION

The present invention relates to communication systems which employ spread-spectrum signals and, more particularly, to a method and apparatus for coherent communication reception in a spread-spectrum communication system.

BACKGROUND OF THE INVENTION

Communication systems take many forms. One type of communication system is a multiple access spread-spectrum system. In a spread-spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread-spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread-spectrum communication techniques exist, including direct sequence modulation, frequency and/or time hopping modulation, and chirp modulation. In direct sequence modulation, a carrier signal is modulated by a digital code sequence whose bit rate is much higher than the information signal bandwidth.

Information (i.e. the message signal consisting of voice and/or data) can be embedded in the direct sequence spread-spectrum signal by several methods. One method is to add the information to the spreading code before it is used for spreading modulation. It will be noted that the information being sent must be in a digital form prior to adding it to the spreading code, because the combination of the spreading code and the information, a binary code, typically involves modulo-2 addition. Alternatively, the information or message signal may be used to modulate a carrier before spreading it.

These direct sequence spread-spectrum communication systems can readily be designed as multiple access communication systems. For example, a spread-spectrum system may be designed as a direct sequence code division multiple access (DS-CDMA) system. In a DS-CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is approximately zero.

Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are not enhanced.

It will be appreciated by those skilled in the art that several different spreading codes exist which can be used to separate data signals from one another in a DS-CDMA communication system. These spreading codes include but are not limited to pseudonoise (PN) codes and Walsh codes. A Walsh code corresponds to a single row or column of the Hadamard matrix.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the required signal to noise ratio usually expressed as error bits per noise density (i.e., $E_b/N_0$ which is defined as the ratio of energy per information-bit to noise-spectral density), to recover the signal at the cost of expending more bandwidth than would otherwise be necessary to transmit the data signal. For example, Walsh code words can be used to channel code a data signal prior to modulation of the data signal for subsequent transmission. Similarly PN spreading codes can be used to channel code a data signal.

However, channel coding alone may not provide the required signal to noise ratio for some communication system designs which require the system to be able to handle a particular number of simultaneous communications (all having a minimum signal to noise ratio). This design constraint may be satisfied, in some instances, by designing the communication system to coherently detect transmitted signals rather than using non-coherent reception techniques. It will be appreciated by those skilled in the art that a coherent receiver requires less signal to noise ratio (in $E_b/N_0$) than that required by a non-coherent receiver having the same bit error rate (i.e., a particular design constraint denoting an acceptable interference level). Roughly speaking, there is a three decibel (dB) difference between them for the Rayleigh fading channel. The advantage of the coherent receiver is more significant when diversity reception is used, because there is no combining loss for an optimal coherent receiver while there is always a combining loss for a noncoherent receiver.

One such method for facilitating coherent detection of transmitted signals is to use a pilot signal. For example, in a cellular communication system the forward channel, or down-link, (i.e., from base station to mobile unit) may be coherently detected, if the base station transmits a pilot signal. Subsequently, all the mobile units use the pilot channel signal to estimate the channel phase and magnitude parameters. However, for the reverse channel, or up-link, (i.e., from mobile to base station), using such a common pilot signal is not feasible. As a result, those of ordinary skill in the art often assume that only non-coherent detection techniques are suitable for up-link communication.

A solution for the need for a coherent up-link channel is found in U.S. Pat. No. 5,329,547 to Fuyun Ling, Commonly assigned together with this application to Motorola, Inc. This patent discloses the introduction of reference bits into the information datastream prior to spreading and transmission, and the subsequent extraction of these reference samples and their use in forming an estimate of the channel response. This estimated channel response is in turn used to coherently detect estimated data symbols.

While this solution allows for coherent detection, it assumes that more or less standard synchronization and rate detection techniques are used. However, such techniques do not take advantage of the known synch pattern, and there are additional impairments to receiver performance that might be improved, if advantage could be taken of this known synch pattern. Among such problems are frequency offsets, "fat" finger fading, and π/4 QPSK (quaternary phase shift keying) synchronization. Frequency offsets may arise, for example, from the transmitter/receiver clock not being perfectly locked due to inaccuracies in the crystal oscillator, as well as from large Doppler frequency shifts (such as from vehicles moving at high speeds in open spaces). A "fat" finger is a finger of a demodulator circuit that straddles more than one ray having less than a chip of differential delay; where a "fat" finger occurs without some form of compensation, it is possible for the finger to center on the weaker ray, with consequent degradation in signal quality. Further, if rate detection is either limited to only those frames always occupied under all speech rates (i.e., frames energized during ⅛th rate speech coding), or is performed on all frames there is a greater likelihood of an erroneous rate determination, ultimately degrading both signal acquisition and channel estimation. There thus remains a need for an improved coherent communication system which compensates for these and other problems.

BRIEF DESCRIPTION OF THE DRAWINGS

FIG. 6 is a block diagram showing a preferred embodiment buffer and timing control for use in the receiver shown in FIG. 1.

FIG. 8 illustrates a communication channel frame structure at different rates for use in the communication system shown in FIG. 1.

FIG. 9 is a block diagram showing a preferred embodiment rate estimation and channel estimation circuitry for use in the receiver shown in FIG. 1.

DETAILED DESCRIPTION

Figure 1:
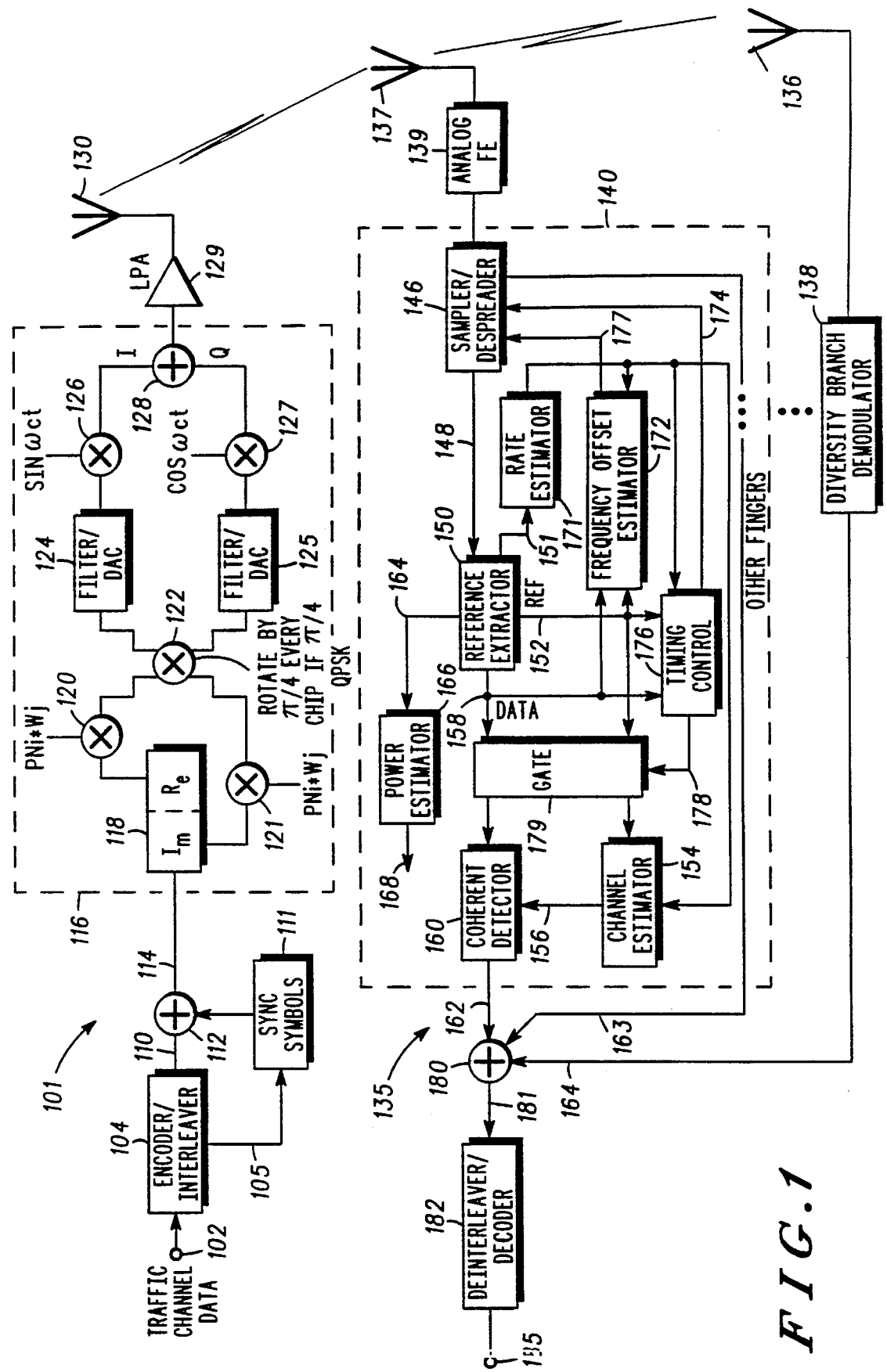
FIG. 1 is a block diagram showing a preferred embodiment communication system in accordance with the present invention.

In the course of the following discussion, an improvement for up-link DS-CDMA communication is presented. This approach employs coherent detection with reference-symbol based channel estimation, and in particular employs improved timing, frequency and rate estimation techniques to optimally detect the received signal. It will be appreciated by those skilled in the art that other types of communication systems (e.g., personal communication systems, trunked systems, satellite communication systems, data networks, and the like) may also be adapted and/or designed to use the principles described herein. It has already been shown that a substantial gain in signal quality ($E_b/N_0$) can be obtained relative to non-coherent detection techniques by applying a coherent detection method to up-link DS-CDMA communication; the improvements discussed below provide even greater performance gains through enhanced synchronization and channel estimation of the receiver.

In order to perform effective coherent detection, it is necessary to obtain an accurate channel estimate. There are basically two types of channel estimation methods: data-based and reference-based. Data-based channel estimation may be implemented as decision-directed or non-decision-directed. For DS-CDMA up-link communication, the channel estimator must operate at low signal-to-noise ratios and the fading is relatively fast. As a result, the decision-directed approach is not appropriate due to the high decision error rate. On the other hand, a non-decision-directed method, such as the one described in the article by A. J. Viterbi and A. M. Viterbi, "Nonlinear Estimation of PSK-Modulated Carrier Phase with Application to Burst Digital Transmission," *IEEE Trans. on Info. Theory*, Vol. IT-29, No. 4, pp. 543–551, July 1983, always has a phase ambiguity, e.g., 180° ambiguity for binary phase shift key (BPSK) signaling or 90° ambiguity for quaternary phase shift key (QPSK) signaling, in the channel estimate. As a consequence, it is necessary to use differential coding to eliminate its effect. However, as will be appreciated by those skilled in the art, in communication systems having a differential coded signal transmitted over Rayleigh fading channels, even with coherent detection, still need over 3 dB higher $E_b/N_0$ than non-differentially coded phase shift keying (PSK) signaling.

One way to solve the decision error and phase ambiguity problem is to use reference symbols for channel estimation. Reference-symbol-based channel estimation is described as follows. Reference symbols known to the receiver are inserted into a sequence of information bearing data bits, which may be coded symbols. At the receiver, the received signal samples corresponding to the reference symbols are used to generate a channel estimate. Because the reference symbols are known to the coherent direct-sequence spread spectrum receiver, there are no decision errors and the resulting channel estimate does not have a phase ambiguity. As a result, a robust communication system with non-differentially coded signaling is provided.

The inserted reference symbols can be organized in blocks or uniformly distributed. For a flat fading channel, it is desirable to insert reference symbols periodically and uniformly in the data stream. For a DS-CDMA up-link with a RAKE receiver for frontend processing, we can treat the output of each RAKE "finger" as being a flat faded signal. Thus, the preferred embodiment communication system will uniformly insert one reference symbol for every M coded data symbols.

The basic operation of RAKE receivers are described in an article by R. Price and P. E. Green, Jr., "A Communication Technique for Multipath Channels," *Proceedings of the IRE,* March 1958, pages 555–570. Briefly, a RAKE receiver performs a continuous, detailed measurement of the multipath characteristic of a received signal. This knowledge is then exploited to combat the selective fading by detecting signal from each path individually, using a correlation method, and algebraically combining those echo signals into a single detected signal.

Referring now to FIG. 1, a system for coherent communication in a spread-spectrum communication system is shown. In order to provide a better understanding of the preferred embodiment receiver disclosed below, a description of a preferred transmitter that can be advantageously used with such a receiver will be discussed first. Beginning with the encoding and interleaving portion 104 of a transmitter 101 of the communication system, traffic channel data bits 102 are input to an encoder at a particular bit rate (e.g., 9.6 kilobit/second). The input traffic channel data bits may include voice converted to data by a vocoder, pure data (including video), a combination of the two types of data, etc. The encoder encodes the input data bits 102 into data bits at a fixed encoding rate (1/r) with an encoding algorithm which facilitates subsequent maximum likelihood decoding of received data samples into data bits (e.g. convolutional or block coding algorithms). For example, the encoder encodes input data bits 102 (e.g., 192 input data bits that were received at a rate of 9.6 kilobits/second) at a fixed encoding rate of one data bit to three coded data bits (i.e., ⅓) such that the encoder outputs data bits, e.g., 576 data bits output at a 28.8 kilobit/second rate. These data bits are then input into an interleaver which organizes the data bits into blocks (i.e., frames) and block interleaves the input data bits. In the interleaver, the data bits are individually input into a matrix which defines a predetermined size block of data bits. The data bits are input into locations within the matrix so that the matrix is filled in a column by column manner. The data bits are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data bits. The interleaved data bits 110 are output by the encoder/interleaver 104 at the same data bit rate that they were input to the interleaver (e.g., 28.8 kb/s (kilobits/second)). The predetermined size of the block of data bits defined by the matrix is derived from the maximum number of data bits which can be transmitted at a coded bit rate within a predetermined length transmission block. For example, if data bits are output from the encoder at a 28.8 kilobits/second rate, and if the predetermined length of the transmission block is 20 milliseconds, then the predetermined size of the block of data bits is 28.8 kilobits/second times 20 milliseconds which equals 576 data bits which defines an 18 by 32 matrix.

Figure 2:
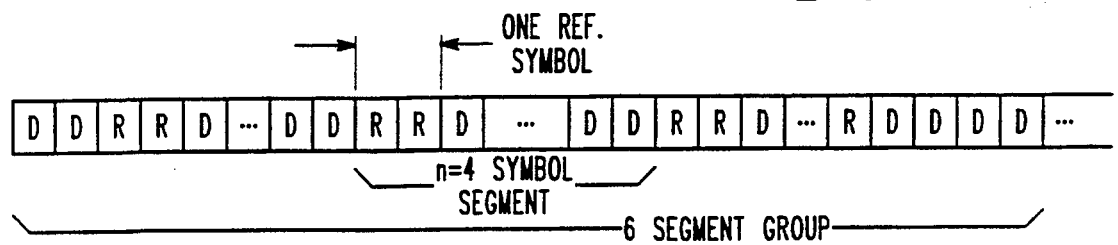
FIG. 2 illustrates a preferred embodiment communication channel frame structure for use with the communication system shown in FIG. 1.

The interleaved data bits 110 are then input to a reference bit inserter 112 which inserts L known reference bit pairs (generated by synch bit generator 111, which receives rate information 105 from the vocoder, in the illustrated case via encoder 104) for every M interleaved data bit pairs 110. To simplify the following discussion, it will be assumed that L=1 and M=3 (as is illustrated in FIG. 2), making a four symbol group. It will be appreciated by those skilled in the art that L and M could be any value without departing from the scope and spirit of the present invention. In a preferred embodiment, the inserted reference bits will have values so as to form predetermined sequences from which a receiver can determine the appropriate rate information. Thus, for example, when using an IS-95-like structure of 16 power control groups of 24 symbols each per frame, together with the reference bit structure of the present invention (e.g., each power control group having 6 segments each of 1 reference symbol (L=1) and 3 data symbols (M=3, where M is the number of data bit pairs between reference bit pairs), the following sequences could be used: 1) for full rate, insert reference symbols (r0 through r95, i.e. all symbols (6 each) for the 16 power control groups) the value 1+j (=$r_0$); 2) for half rate, insert symbols=$r_0$ in the first and ninth groups, even symbols=$r_0$ and odd symbols=$-r_0$ in the third, fifth, seventh, eleventh, thirteenth and fifteenth groups, and all remaining symbols=X (where X means "don't care" since these groups are not transmitted); and 3) for eighth rate, insert even symbols=$r_0$ and odd symbols=$-r_0$ in the first and ninth groups, and all remaining symbols=0. If randomization of the power group positions were employed, a mapping in sequence of the energized groups to those selected by the randomization can be readily accomplished. (IS-95 randomization requires that possible eighth rate groups used be a subset of possible quarter rate groups be a subset of possible half rate groups, such as is illustrated in FIG. 8). One skilled in the art will appreciate that different sequence families may be employed, and such may also be extended if additional information messages are to be sent. Thus, for example, if a further information bit B (e.g., a power control bit, or received frame error rate at the transmitting unit 101) is to be sent per frame, a first reference sequence family could be used (such as that described above) for B=0. If B=1, the additional sequences could be used: 1) for full rate, all symbols=$r_0$ in the odd (1, 3 . . . 15) groups, and=$-r_0$ in the even (2, 4 . . . 16) groups; 2) for half rate, the same sequence is used as in full rate except for groups 3, 7, 11, and 15, in which the group reference symbol pattern is $r_{half}$={$r_0$ $r_0$ $r_0$ $-r_0$ $-r_0$ $-r_0$}; 3) for quarter rate, groups 5 and 13 are assigned the pattern $r_{half}$ while groups 1 and 9 remain as before; and 4) for eighth rate, groups 1 and 9 are also assigned the pattern $r_{half}$. While the probability of transmitting B correctly under full rate remains high (Pr{error}<10% may be acceptable for this purpose), the probability of error is higher for lower rates since the sequences are not maintained at zero crosscorrelation at the lower rates.

When L=1 and M=3, reference bit inserter 112 outputs 768 reference-coded bits 114 for each block (i.e., frame) such that two reference bits are inserted between each group of six data bits. An example of a block (i.e., frame) of reference-coded data bits 114 ready for spreading consisting of 48 bits is shown in FIG. 2 (where each d represents a data bit and each r represents a reference bit).

The reference-coded data bits 114 are input to a modulating portion 116 of the communication system. The data bits 114 are received into a buffer 118, from which the real and imaginary portions of the bitstream are subsequently read out and separately spread with a Walsh code Wj and PN code sequences PNi via multipliers 120–121. Alternatively, a differing code sequence PNi and PNq may be used for the real and imaginary branches. When the same PNi code is used for both real and imaginary datastreams, the Walsh code serves as a user specific sequence of symbols or unique user code. The reference-coded datastream arrives at modulating portion 116 at a rate of 38.4 kilobits/second. Each section of 6 groups (i.e., 3 pair (a pair making 1 QPSK symbol) of data bits, 1 pair of reference bits×6 groups=48 bits) is then spread so as to output a single 64 symbol length code per input symbol at a higher fixed symbol rate (e.g., 1228.8 kilosymbols/second, also referred to as 1.2288 Megachips/second). It will be appreciated by those skilled in the art that the reference bits and data bits within the stream of reference-coded data bits 114 may be spread according to numerous other algorithms into a sequence of larger length codes without departing from the scope and spirit of the present invention.

For π/4 QPSK modulation the spread symbol stream is then rotated via multiplier 122 by π/4 every chip; for alternative modulations like QPSK this step is omitted. The symbol streams are then FIR (finite impulse response) filtered to reduce out of band energy below a set value, converted to an analog signal stream, and further low pass filtered via filter/DACs (digital to analog converters) 124, 125. After being converted to an analog signal the signals from the two symbol streams are quadrature modulated and summed via multipliers 126, 127 and summer 128; alternatively, the signals could be combined via direct digital synthesis. Finally, the modulated signal is amplified by LPA (linear power amplifier) 129 and provided to antenna 130 for transmission over the communication channel 131.

The preferred embodiment receiver 135 of the communication system receives the transmitted spread-spectrum signal from over the communication channel 131 through antenna 137. The received reference symbol coded spread spectrum signal is filtered and downconverted by an analog frontend 139, and inputted to demodulator circuitry 140. Antenna 136 and demodulator 138 are similarly provided for space diversity reception of the signal.

The spread spectrum signal is next sampled into despread samples 148 by despreader and sampler 146. These samples 148 include both reference and data samples, so a reference sample extractor 150 is used to separate the reference sample information from the data signal samples. The reference samples 152 are output to a channel estimator 154, while the remaining data samples 158 from the despread sampled signal 148 are output to a coherent detector 160 for later coherent detection of data symbols 162 from the data samples 158. Finally, the detected data symbols 162–164 are summed in summer 180 with detected data symbols from other fingers or diversity paths and output to the decoding portion 182 of the communication system.

The despreader and sampler 146 preferably samples the received spread-spectrum signal at a predetermined rate (e.g., 1.2288×8=9.8304 Megasamples/second). Subsequently, the sampled signal is decimated to 1.2288 Megasamples/second and despread by correlating the received sampled signals with the spreading code. The resulting despread sampled signal 148 is sampled at a predetermined rate and output to the reference sample extractor 150 (e.g., 19.2 kilosamples/second so that a sequence of 64 samples of the received spread-spectrum signal is despread to and/or is represented by a single data sample).

The reference sample extractor 150 preferably extracts the reference samples 152 from the despread sampled signal 148 and outputs the reference samples 152 to a channel estimator 154. The data samples 158 from the despread sampled signal 148 are output to a coherent detector 160 for later coherent detection of data symbols.

However, a problem may arise if the channel estimator 154 output is used in conjunction with only standard synchronization methods. In this case the rate of phase rotation of the received signal may be as high as several kilohertz, impairing signal acquisition. In order to provide improved synchronization and acquisition, the reference samples 152 and data samples 158 are also input to a synchronization device, preferably including frequency offset estimator 172 and a timing control 176. To further improve the quality of the synchronization and channel estimation, a rate estimator 171 determines the rate at which the encoded data was sent (e.g., full, half or eighth rate) from demultiplexed reference samples 151 (explained below), and outputs rate estimate 173 at the end of each received frame to the frequency offset estimator 172 and timing control 176, as well as the channel estimator 154. This use of the rate estimator permits one to use all slots or power control groups of the frame that are energized, rather than just the slots that are energized for all rates, to derive the other estimates. The frequency offset estimator 172 derives an estimate of an offset frequency, such as might be caused by large Doppler shifts or an imprecise oscillator, which estimate drives a frequency locked loop to send a control signal 177 to adjust the frequency of a local oscillator, digital phase corrector (rotator) or similar circuit of the analog frontend 139 or sampler/despreader 146. This permits the residual frequency offset to be locked-in at less than 50 Hz (Hertz), greatly improving signal acquisition and detection. Additional performance gains are provided by the timing control 176 which derives and combines power estimates of the reference and data signals 152, 158 (that may be unbiased), and then are differenced and filtered and input to a delay locked loop to control timing so as to center the finger on the long term average mean ray arrival time. A fast timing (i.e., typically less than one chip) correction is also achieved by comparing the timing difference outputs of multiple timing branches and picking the branch having the maximum value, enabling demodulation to follow the peak power. This correction is accomplished by controlling a gate 179 via a fast timing compensation signal 178. The timing control 176, frequency offset estimator 172, gate 179 and their operations are described in more detail in connection with FIGS. 3 though 7 below.

Finally, the channel estimator 154 filters the phase rotated, extracted reference samples 152 of the selected timing branch with a filter based upon the rate estimate to obtain unbiased, but noisy, channel estimates. In order to obtain a better channel estimate 156, these noisy estimates may be passed through a low-pass filter, which may be fixed or adaptive, to remove the high frequency noise components. The resulting channel estimates 156 are relatively noise-free and can be used for coherent detection. It should be noted that the low pass filtering only gives us a channel estimate for every $(M+1)T$, where M is the number of data bit pairs between each reference bit pair inserted by reference bit inserter 112 (e.g., M=3) and where T is the time interval of each data bit pair (or symbol, for QPSK). To perform coherent detection of transmitted data samples, we need to have a channel estimate for every T. When $(M+1)T$ is short relative to the channel variation time constant, a simple but effective method to get a channel estimate for every T is to perform linear interpolation between two channel estimates separated by $(M+1)T$. However, as will be appreciated by those skilled in the art more sophisticated interpolation techniques may be used if necessary.

In the preferred embodiment coherent communication system, power control may also be used to enhance overall system performance. The power control algorithms may be very similar to the algorithms used in non-coherent communication systems. The preferred embodiment power control algorithm preferably includes estimating received power every 1.25 ms (milliseconds) (i.e., each time slot or power control group), or every 6 reference information samples, i.e., every 18 encoded data samples or 24 total received signal samples. The power estimate may be calculated with several different techniques. One technique is to compute a channel estimate with a power estimator 146 simply using the 6 reference signal samples (i.e., reference samples 152 from reference sample extractor 150) in each 24 sample length group. The square of the magnitude of the channel estimate is then output by the power estimator 166 as the power estimate 168.

After channel estimates 156 are generated, the rest of the receiver is conventional. The coherent detector 160 multiplies the remaining data samples 158 from the despread sampled signal 148 by the conjugate of the channel estimates 156 to generate coherently detected symbols 162.

As will be appreciated by those skilled in the art, multiple receiver branches 138, 140 and antennae 136, 137, respectively, may be employed to achieve improved reception through space diversity. All N diversity receiver branches would operate in substantially the same manner to retrieve data samples from the received spread-spectrum signal in communication channel 131 as the above described receiver branch 140. The outputs 162 through 164 of the N receiver branches preferably are input to an adder 180 which diversity combines the input data symbols into a composite stream of coherently detected data symbols 181.

The individual data symbols 181 which form soft decision data are then input into a decoding portion 182 including a deinterleaver which deinterleaves the input soft decision data (i.e., detected data symbols) 181 at the individual data level. In the deinterleaver, the soft decision data 181 are individually input into a matrix which defines a predetermined size block of soft decision data. The soft decision data are input into locations within the matrix so that the matrix is filled in a row by row manner. The deinterleaved soft decision data are individually output from locations within the matrix so that the matrix is emptied in a column by column manner. The deinterleaved soft decision data are output by the deinterleaver at the same rate that they were input (e.g., 28.8 kilometrics/second). The predetermined size of the block of soft decision data defined by the matrix is derived from the maximum rate of sampling data samples from the spread-spectrum signal received within the predetermined length transmission block.

The deinterleaved soft decision data is then input to a decoder which uses maximum likelihood decoding techniques to generate estimated traffic channel data symbols 185. The maximum likelihood decoding techniques may be augmented by using an algorithm which is substantially similar to a Viterbi decoding algorithm. The decoder uses a group of the individual soft decision data to form a set of soft decision transition metrics for use at each particular time state of the maximum likelihood sequence estimation decoder. The number of soft decision data in the group used to form each set of soft decision transition metrics corresponds to the number of data bit pairs at the output of the convolutional encoder 104 generated from each input data bit 102. The number of soft decision transition metrics in each set is equal to two raised to the power of the number of soft decision data in each group. For example, when a ⅓ convolutional encoder is used in the transmitter 101, three data bits are generated from each input data bit 102. Thus, decoder 182 uses groups of three individual soft decision data to form eight soft decision transition metrics for use at each time state in the maximum likelihood sequence estimation decoder. The estimated data symbols 185 are generated at a rate related to the rate that the soft decision data are input to the decoder and the fixed rate used to originally encode the input data bits 102 (e.g., if the soft decision data are input at 28.8 kilometrics/second and the original encoding rate was ⅓ then estimated data symbols 185 are output at a rate of 9600 bits/second). While this information can be used in determining the occupancy of the various time slots within each frame, in the preferred embodiment this information is already supplied by the rate estimator 171 described in FIG. 9 below.

Turning now to FIGS. 3 through 7, a more detailed description of a preferred embodiment of the receiver 135 is illustrated. For purposes of clarity, only one numeral is used to identify each element appearing in more than one figure. One skilled in the art will recognize that the embodiment illustrated is specifically designed for a $\pi/4$ QPSK (or QPSK if zero rotation) modulated signal. However, the present invention is not limited in application to QPSK signal reception, but may apply to any modulated signal that can be coherently received, including but not limited to OQPSK and BPSK (binary phase shift keying) signals.

Figure 3:
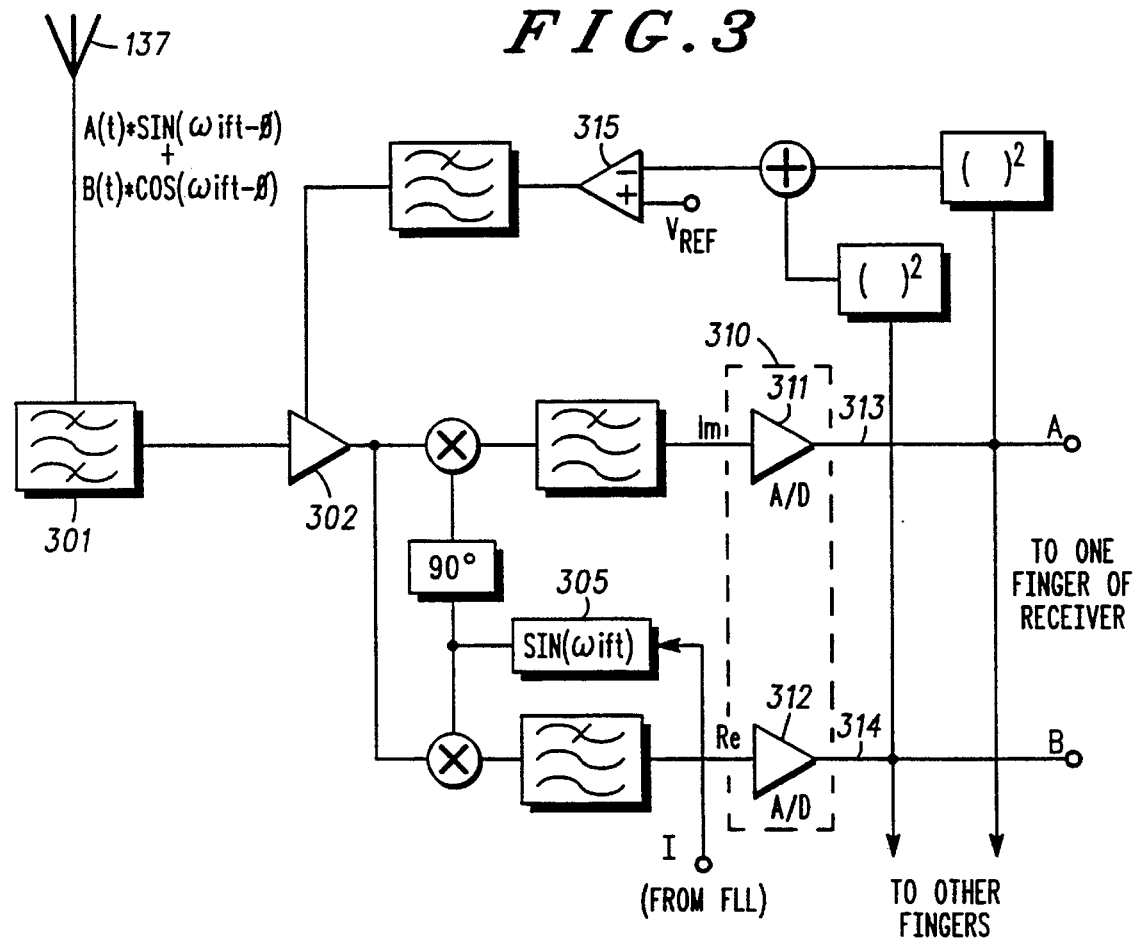
FIG. 3 is a block diagram showing a preferred embodiment receiver front end and sampler for use in the receiver shown in FIG. 1.

FIG. 3 illustrates the analog portion of receiver 135. An IF (intermediate frequency, downconverted) version of the spread spectrum signal is bandpass filtered with filter 301 about a frequency band of interest. The filtered output is gain controlled by AGC (automatic gain control) 302, then separated into imaginary (Im) and real (Re) signal streams by LO (local oscillator) 305. In order to control the frequency offset of LO 305, an input of an estimated offset frequency is provided to LO 305 from frequency locked loop filter 456 of FIG. 4 via input "I." The Im and Re signals are then lowpass filtered, and then digitized by A/D (analog-to-digital) converters 311 and 312 of sampler 310. The Im and Re digitized sample streams 313 and 314 are outputted to each of the fingers of demodulator 140, as well as to the AGC control circuitry. The AGC control circuitry is typical of that found in spread spectrum receivers, being used to optimize the performance of the A/Ds 311 and 312 as well as the overall receiver performance. This control circuitry operates by squaring and summing the digitized IF sample streams, inputting the resultant signal to a difference amplifier 315, and averaging the output to generate the AGC control signal.

Turning to FIGS. 4 through 7, the demodulator section of one of receiver 135's fingers is further illustrated. If $\pi/4$ QPSK modulation is used, the Im and Re digitized samples 313 and 314 are counter rotated $\pi/4$ via multiplier/phase rotator 420; this advantageously permits the $\pi/4$ QPSK signal to be shifted at baseband rather than at RF (radio frequency). The samples are received in a buffer/timing control device 421, which is illustrated in more detail in FIG. 6. Each symbol is oversampled, preferably 8 times the chip rate of 1.2288 Mchip/s. Registers 510 and 512 will thus have 8 consecutive samples of the same chip (i.e., spread symbol) period that can be tapped or addressed, e.g. via taps 513 through 515. The actual register locations that are addressed is controlled by a timing branch input controller 520. In the preferred embodiment three different timing branch input leads 422 through 424 are connected via controller 520. The controller 520 is responsive to a timing control signal 177 ("G") to adjust the addressing of the buffers 510, 512 so as to keep the signal optimized on a middle, "on time" lead 422. The other two leads 423, 424 sample what should optimally be either a late (or retarded replica) or an early sample (or advanced replica) of the symbol having approximately the same power. When the sample energy is not maximized, i.e., when a difference exists between the power of the late and early timing branches, the controller serves to adjust the taps or lead addresses one sample (i.e., one buffer register) prior to reading the next chip (i.e., every 1/1.2288 µs) until the center tap 514 again has the maximum energy (i.e., is the "on time" branch). This is accomplished in the preferred embodiment, illustrated in FIG. 7 and discussed more fully below, by performing a differencing operation between the early and late timing branch power estimations.

Following Buffer and Timing Control 421, the Re and Im samples are despread by despreader 425. Despreader 425 includes multipliers 426 and 427 for multiplying the Re and Im samples by the PN and Walsh code sequences (despread signals), thus correlating the received signal with the assigned spreading codes. One skilled in the art will appreciate that if a complex spreading sequence (i.e., PNi and PNq) is used in transmitter 101 to spread the reference coded data bits, which will be essential in some applications and would be required for BPSK, duplicate multipliers should be used in despreading the complex received spread symbols. Despreader 425 is replicated in each timing branch, so that early, late and on-time despread signals (samples) are formed. The resulting signals in the on-time branch are integrated over each sample period by integrate and dump circuits 428 and 429, so as to output I (in-phase) and Q (quadrature phase) samples 431 and 432, corresponding to the real and imaginary quadrature phase samples Re and Im.

The preferred embodiment of the reference sample extraction circuit 150 operates by multiplying each of the I and Q samples 431 and 432 by synch(I) (via multipliers/correlators 433 and 437) and synch(Q) (via multipliers 434 and 436) signals and summing the respective I and Q branches via adders 435 and 438. The synch(I) and synch(Q) are the complex conjugate of the known reference (synch) symbols, for example all −1s or 1s, the exact sequence being known after the rate estimate, R, is available at the frame end. The purpose for this structure is to derive a noisy estimate of the channel response from the I and Q components. Since a DS-CDMA up-link can be viewed as multiple flat-fading channels, for each flat fading channel the received signal after despreading can be expressed as:

$$r(n)=h(n)a(n)+z(n) \qquad \text{(eq. 1)}$$

where r(n) is the received sample at n (or nT where T is the interval at which the signal of interest, e.g., reference samples, is present after despreading), a(n) is the corresponding transmitted symbol, h(n) is a low-pass random complex variable characterizing the fading channel, and z(n) is the additive noise or interference, which is approximately white and Gaussian. Because only the transmitted reference symbols $a_{ref}(n)$ are known, the channel estimate is made using the received I and Q samples 431 and 432 corresponding to a transmitted reference symbol. In this case, the noisy estimate of the channel coefficient can be expressed as:

$$\hat{h}(n)=r(n)aref^*(n) \qquad \text{(eq. 2)}$$

In quadrature complex notation, this becomes $$\hat{h}_I(n)+j\hat{h}_Q(n)=(r_I(n)+jr_Q(n))(a_{refI}(n)-ja_{refQ}(n)) \qquad \text{(eq. 3)}$$

$$=(r_I(n)a_{refI}(n)+r_Q(n)a_{refQ}(n))+j(r_Q(n)a_{refI}(n)-r_I(n)a_{refQ}(n)) \qquad \text{(eq. 4)}$$

The first component of equation 4 is equivalent to the reference sample I component output 439, while the second component of equation 4 is equivalent to the reference sample Q component output 440, (which are together equivalent to inputs 152 of FIG. 1) when r(n) is a received reference sample. Both reference sample I & Q outputs 439 and 440 are fed to channel estimator 154, while the I and Q data samples are fed to coherent detector 160.

While the channel estimator 154 can determine, using the reference sample I and Q outputs 439 and 440, the instantaneous phase and magnitude of a channel for purposes of coherent detection, it is, vulnerable to problems of frequency drift. Relatively stable, large frequency offsets may arise from influences such as an inaccurate oscillator causing an imperfect lock on the transmitter/receiver clock, and large and steady Doppler shifts. Such offsets in conventional communication systems are typically corrected by means of a phase-locked loop (PLL). However, since in the preferred embodiment the channel estimator 154 can estimate the instantaneous phase quite accurately, a frequency locked loop (FLL) may be used instead of a PLL.

In the preferred embodiment the frequency offset estimator 172 includes two portions, each basing its estimates on the respective data (431 and 432) and reference (439 and 440) output signals. In the latter case, an offset frequency detector 445 includes two delays 446 and 447, two multipliers 448 and 449, and an adder 450. The detector operates by multiplying a delayed I component signal 439 by Q component signal 440 in multiplier 448, and multiplying a delayed Q component signal 440 by I component signal 439 in multiplier 449. The summed output of the detector can be expressed as:

$$f_{est}=\hat{h}_I(n-1)\hat{h}_Q(n)-\hat{h}_Q(n-1)\hat{h}_I(n) \qquad \text{(eq. 5)}$$

where $f_{est}$ is a scaled estimate of the offset-frequency.

The offset frequency can also be estimated using the information bearing (data) received signal samples 431 and 432. Because the actually transmitted data bits are not known, there will be a 90° (or 180° for BPSK) phase ambiguity in the phase estimate. To eliminate this ambiguity, a complex 4-th power operation is performed on each received signal sample (squaring for BPSK) in circuit 442. The real (I) and imaginary (Q) components of the fourth powered samples are sent to an offset frequency detector 443 which is identical to the offset-frequency detector 445 for the reference samples. In this manner, offset-frequency detector 443 also generates a scaled estimate of the offset-frequency.

Either of the scaled estimates of the offset frequency from these two detectors 443, 445 can be used to drive the frequency-locked loop. On the other hand, they can be combined to form an even better offset-frequency estimate, which in turn is used to drive the frequency-locked loop. If the frequency estimates from the reference samples 439, 440 and data samples 431, 432 are denoted by $f_d$ and $f_r$, respectively, a combined estimate can be obtained as:

$$f_c=w_rf_r+w_df_d \qquad \text{(eq. 6)}$$

where $w_r$ and $w_d$ are two weighting factors, whose values are selected to maximize the ratio of the squared value of the detected offset frequency and its variance. The optimal values of these weighting coefficients are functions of the sample signal to noise ratio, which a skilled artisan will know how to derive. When the signal to noise ratio of the despread samples is relatively high, we can simply let $w_r=w_d$. These weighting factors are applied to the detector 443, 445 outputs via multipliers 451, 452, and the weighted outputs are summed via adder 453. When several RAKE fingers are used in the receiver 135, such as in the illustrated embodiment, the outputs of the offset frequency detectors of all the fingers can be combined via combiner 454 to generate a scaled overall offset-frequency estimate. These outputs can also be weighted, e.g., rejecting outputs with a value beneath a threshold, and/or having a scaled weighting increasing with magnitude.

Figure 5:
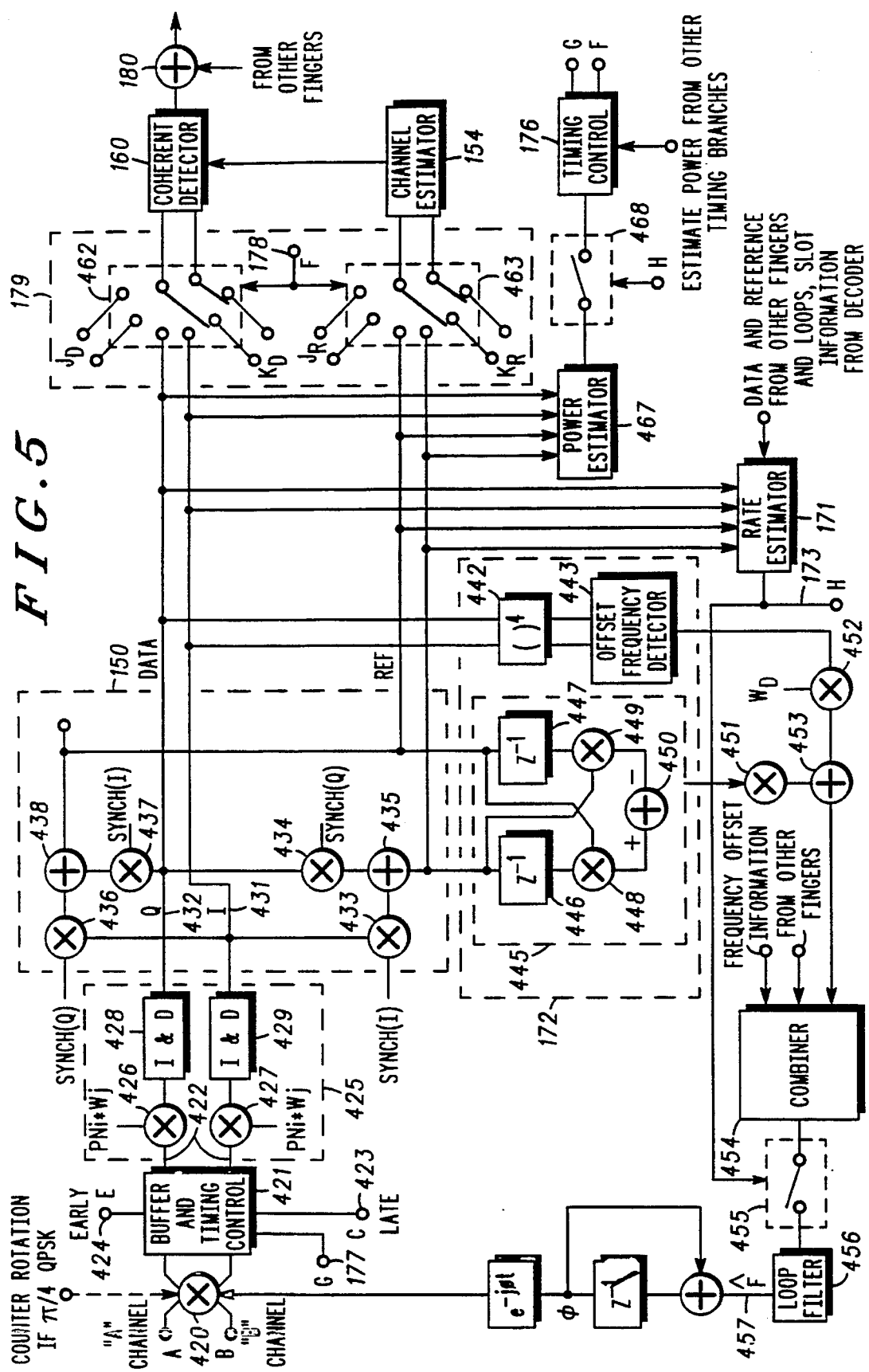
FIG. 5 is a block diagram showing a second embodiment demodulation circuitry for use in the receiver shown in FIG. 1.

This scaled overall offset-frequency estimate is sent to a loop-filter 456 via gate 455 (the function of which is described below). For the simplest first order FLL, the loop filter may consist of a scaling constant and an integrator. The first order FLL is adequate for most applications; a higher order FLL, which has poles in the loop filter, may be useful in some special cases. The design of the FLL and parameter selection will be well known to persons skilled in the art. (See, e.g., F. M. Gardner, "Characteristics of Frequency-Tracking Loops," in Phase-Locked Loops (Editors W. C. Lindsey and C. M. Chie), IEEE Press, New York, 1986.) The output "I" 457 voltage of the loop filter is used to correct the frequency offset by feeding it to LO 305. Alternatively the output 457 may be fed to a digital phase corrector (rotator), such as phase rotator 420; an example of such is illustrated in FIG. 5, in which output 457 is fed into phase rotator 420 rather than LO 305.

Figure 7:
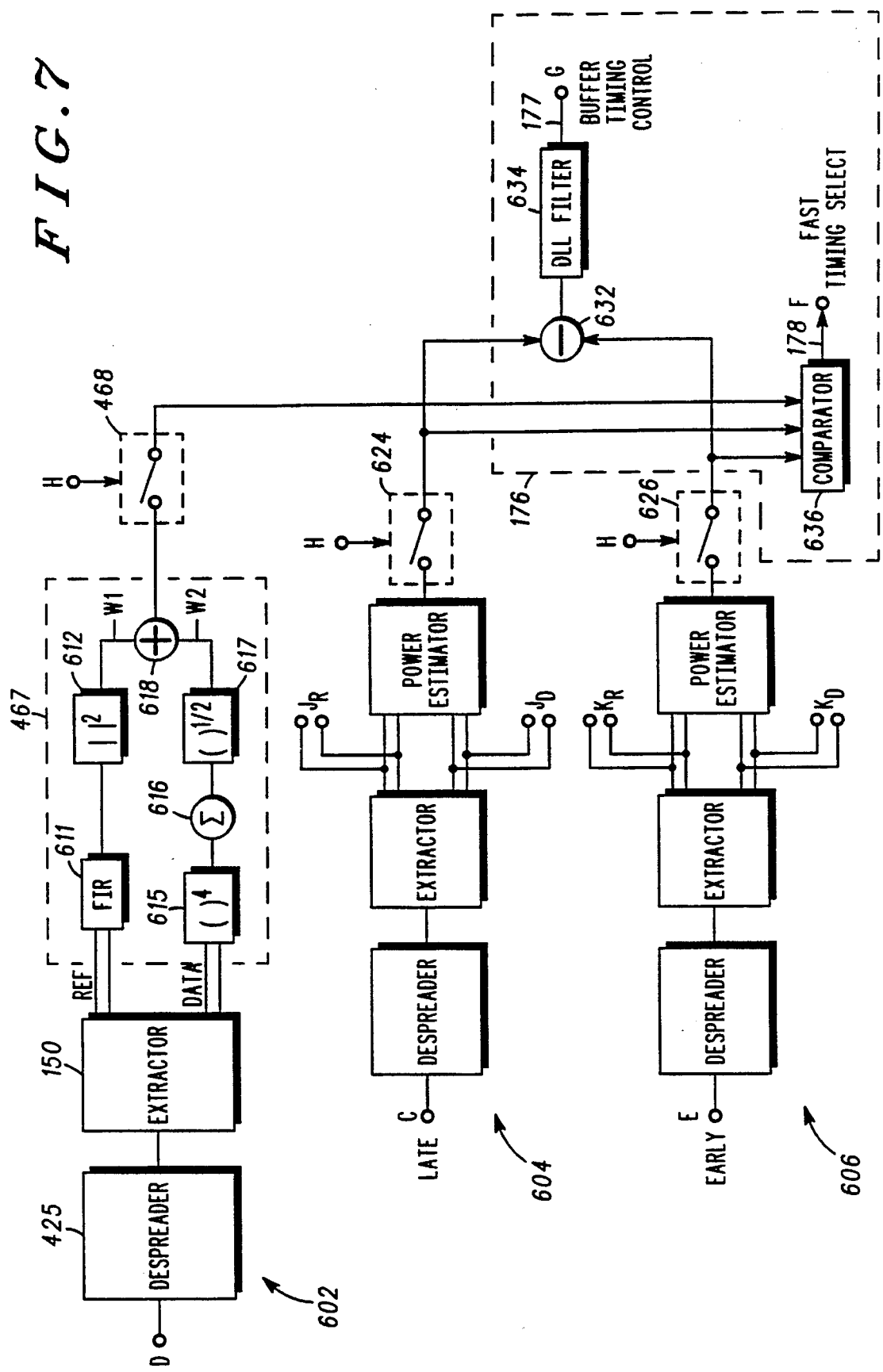
FIG. 7 is a block diagram showing a preferred embodiment power estimator and timing control circuitry for use in the receiver shown in FIG. 1.

Also receiving reference sample 439, 440 and data sample 431, 432 outputs is power estimator 467, a preferred embodiment of which is illustrated in FIG. 7. The reference sample outputs 439, 440 are filtered by FIR 611 to further remove noise. The filtered output is squared in circuit 612, the squared magnitude yielding a reference sample (coherent) signal power estimate.

While the coherent signal power estimate may be sufficient for timing control, improved control can be obtained by also forming a signal power estimate based on data sample outputs 431, 432. In the preferred embodiment these outputs 431, 432 are complex multiplied to the fourth power in circuit 615 (which may be a complex power estimator), and then accumulated or averaged by accumulator 616 for each reference sample interval (i.e., 3 data samples per reference sample in the embodiment above, or 1.25 ms/slot÷(42 samples/slot÷3 pair of reference samples)≈89.3 µs (microseconds)). The square root of the magnitude of the accumulator output is derived by circuit 617, which provides a signal power estimate of the noncoherent branch. Finally, both signal power estimates are weighted, for example by maximizing the ratio of the power estimate to its variance, and summed in combiner/adder 618 to yield a power estimate for the timing branch.

This estimate for timing branch 602, along with similar estimates for timing branches 604 and 606 (corresponding to the late and early timing branches discussed above in connection with FIG. 6), are sent to timing control unit 176 via gates 468, 624 and 626. (The function of gates 468, 624 and 626 is discussed below in connection with rate estimator 171). Timing control 176 serves to compensate for timing drift, typically on the order of up to one chip per second.

Timing drift is compensated for by differencing the power estimates of two or more timing branches. In the preferred approach, where three timing branches are used, "on time," "late" and "early" branches 602–606, one may advantageously use the late and early branches 604, 606 to obtain the power estimates for samples with sample timing $t_n+\tau$ and $t_n-\tau$, where $t_n$ is the "on time" sample timing. The difference between the estimates of the late and early timing branches, determined by differencer 632, indicates the direction of the drift of the correct timing. The difference can be time averaged, and if the difference is zero on average, the sampling timing is correct and no adjustment is made. If the filtered difference is positive or negative, a delay-locked loop filter 634 generates a control signal 177 ("G") which causes controller 520 (see FIG. 6) to adjust the sampling timing towards $+\tau$ or $-\tau$ from the previous sampling time, i.e., where the correct sampling time is located. One skilled in the art will understand how to set a delay locked loop and filter 634 with appropriate parameters, depending on other factors such as the system design. (See, e.g., Simon et. al., Spread Spectrum Communications Vol. 3, Computer Science Press, 1985.) For example, a filter constant to compensate for a mobile moving at 150 km/hr (kilometers/hour) relative to a base station might be on the order of 6 seconds (i.e., ((299706 km/sec(speed of light))÷(1228800 chips/sec))÷((150 km/hr)÷(3600 sec/hr))=5.8 sec/chip), indicative of a full chip clock slippage every 5.8 seconds due to the mobile's movement. The maximum slew rate required may be 2 to 5 times faster in order to account for very fast trains and initial missettings. The result of this long term timing compensation is to center the finger on the long term average mean ray arrival time.

Short interval timing is also desirable to compensate for circumstances such as a "fat finger," or one which acquires two rays within a chip of each other that fade independently. A preferred approach for fast timing adjustment is to determine by a comparator 636 which of the gated power estimations from timing branches 602, 604, or 606 has the maximum value. A short time constant (e.g., less than 1 sec) low pass filter (not shown) may be optionally used to reduce the noise components of the gated power estimations prior to comparison. Comparator 636 outputs a control signal 178 ("F") to the selector or gate 179, which switches between the various timing branch Data and Reference sample outputs, depending on which has the maximum estimated power. In the case illustrated in FIG. 4, gates 462 and 468 of selector 179 are closed to the extractor outputs $K_r$ and $K_d$ of the early timing branch 606, indicating that the maximum signal power has been determined to be received from tap 513 of buffer 421. By this means only one timing branch output, that determined to have the maximal power for the finger at the instant, will be utilized for channel estimation and coherent detection for that finger at that instant. It is expected that a window limit cycle will typically be centered about the value determined by the long term timing compensation branch, and that this limit is typically no more than about ±0.5 chips. No more movement is needed because typically another finger will have been assigned to the adjacent-in-time energy.

A further enhancement can be achieved in the case where the communication signal is a TDM (time division multiplexed) signal. FIG. 8 illustrates one such signal, having a 20 ms frame with sixteen 1.25 ms slots (e.g., the power control groups) per frame. When less than a full rate signal is being sent, the unused slots may be advantageously gated or masked out, so as to reduce noise and provide an improved channel estimate. Whether the signal uses 2, 4, 8 or all 16 slots is decided by the rate required; but, except for full rate, the slots used may differ from frame to frame depending on the rate. Furthermore, the slot group for the ⅛ rate is a subset of the slot group for the ¼ rate which is a subset of the slot group for the ½ rate. This arrangement is shown in FIG. 8, where the shaded intervals represent transmitted energy.

Figure 4:
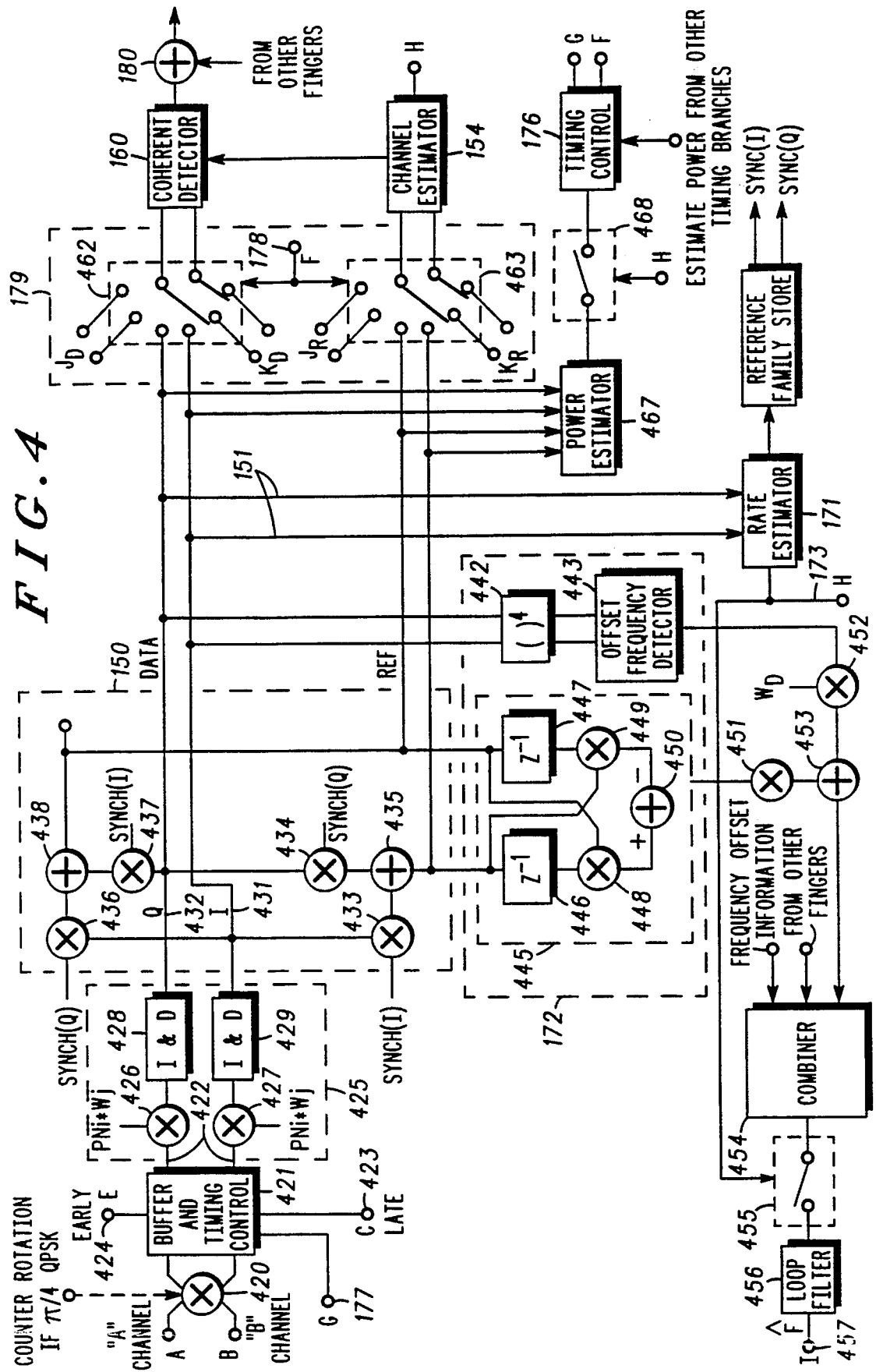
FIG. 4 is a block diagram showing a preferred embodiment demodulation circuitry for use in the receiver shown in FIG. 1.

The integrate & dump circuits 428 and 429 of FIG. 4 are set to span a 1.25 ms slot interval. Rate estimator 171 receives the reference output (i.e., outputs 489 and 440). In the absence of actual rate information being transmitted (via the sequence family discussed above) one could still determine rate information, albeit less efficiently. In such a case the rate estimator 171 could be designed as follows, and as shown in the alternative embodiment of FIG. 5. First, the rate estimator 171 could also receive outputs 431 and 432, as well as similar outputs from other fingers, and may even receive information from the frame decoder, and uses these outputs to determine which intervals may be summed and which must be masked out. For the long term timing compensation, the occupancy (power) estimate of rate estimator 171 may be delayed until the frame decoding decision and its slot occupancy determination is made. For the short interval timing compensation branches, it may be more advantageous to estimate the slot occupancy by measuring the power difference from one slot to the next. In making this estimate, it is helpful to more heavily weight the input of those fingers that have the strongest received signal. Since each frame has at least two occupied slots, the occupancy of the next 2 can be estimated by comparing the power in those slots to that of the first two. This estimate should be more heavily weighted for the stronger power fingers. A possible procedure would be to make the rate decision only with input from the strongest finger (or an average of the two strongest if they are approximately equal). An alternative is to power sum the estimates for an overall estimate. The expected noise power is typically larger than the sample power at this point; so, by averaging over the 24 samples of the next two candidate slots, 6.9 dB improvement in the estimate is achieved which should be good enough to be correctly estimating slot occupancy most of the time if the strongest finger is used to pace the estimate. If the initial decision is that a ⅛ rate frame is being received, the procedure is preferably continued to insure this is a correct decision. In this approach, the next 4 slots would be averaged and, if large enough, the initial ⅛ rate decision is changed. This can be continued up to an examination of the full rate interval powers.

A similar gating arrangement is used for the frequency offset estimator 172. In this case, the output of the offset frequency detectors 443, 445 must be weighted, and gated via gate 455. When the frequency is quickly changing the update must be on the order of a 20 ms data frame. Since the channel estimator 154 can handle the fast phase change due to Doppler shifts, the objective of the frequency locked loop is to compensate for slow variations of large but relatively stable frequency offsets without introducing unacceptable additional noise. The frequency-locked loop therefore performs a long term averaged control to accommodate frequency offsets and steady-state Doppler frequency shifts (such as moving toward a base station in a Rician fading radio channel). The long term control can take advantage of the rate decision of the decoder 182 by gating the signal input to the FLL filter 456.

However, the presently preferred approach to rate estimation takes advantage of the ability to send a family of reference symbol sequences, each sequence defining a different rate and hence the slot occupancy. This provides for a more accurate rate estimate, with less complexity as well as avoiding the use of older or delayed information from decoder 182.

Figure 10:
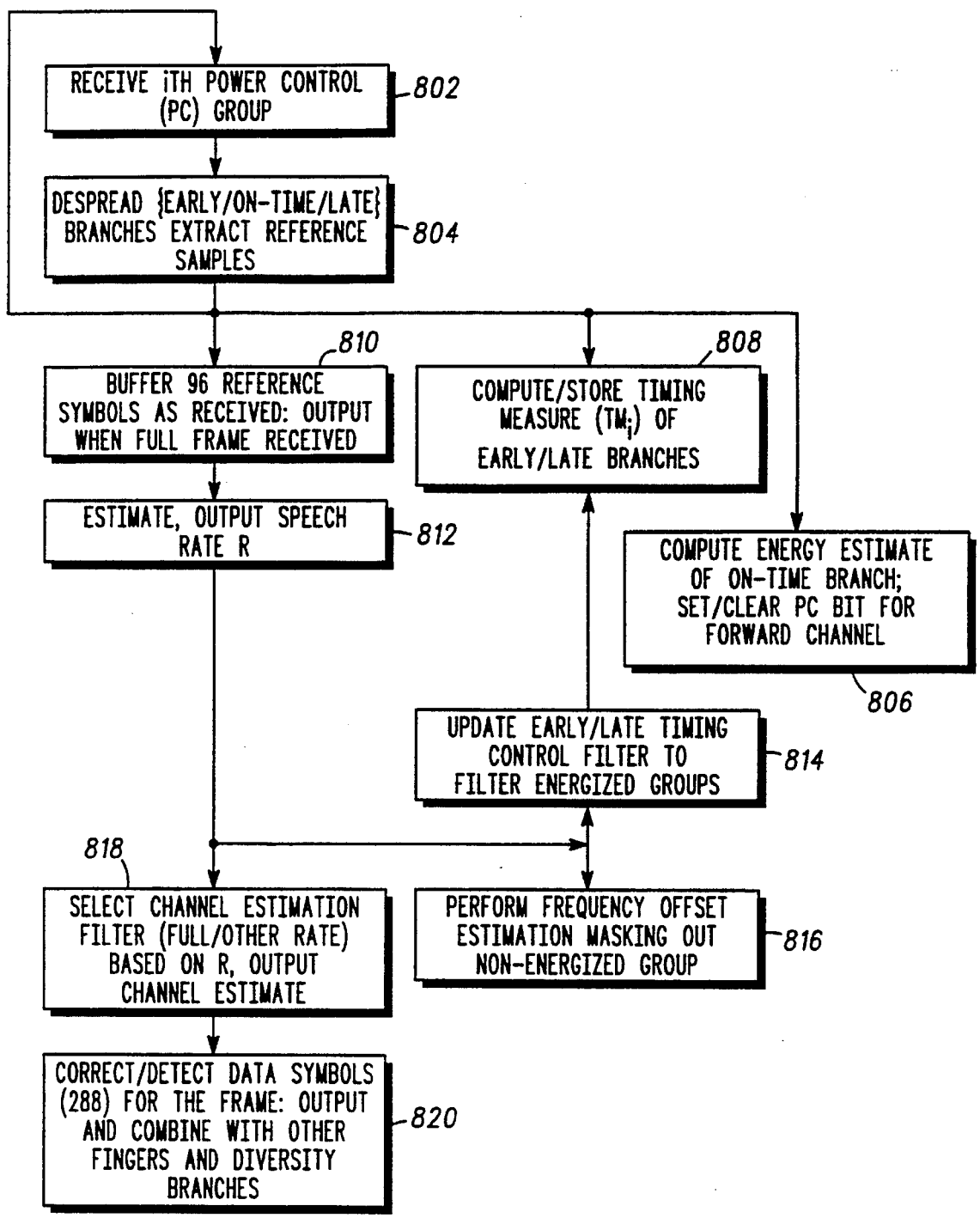
FIG. 10 is a flow chart illustrating a preferred embodiment method for rate estimation and channel estimation in the receiver shown in FIG. 1.
Figure 11:
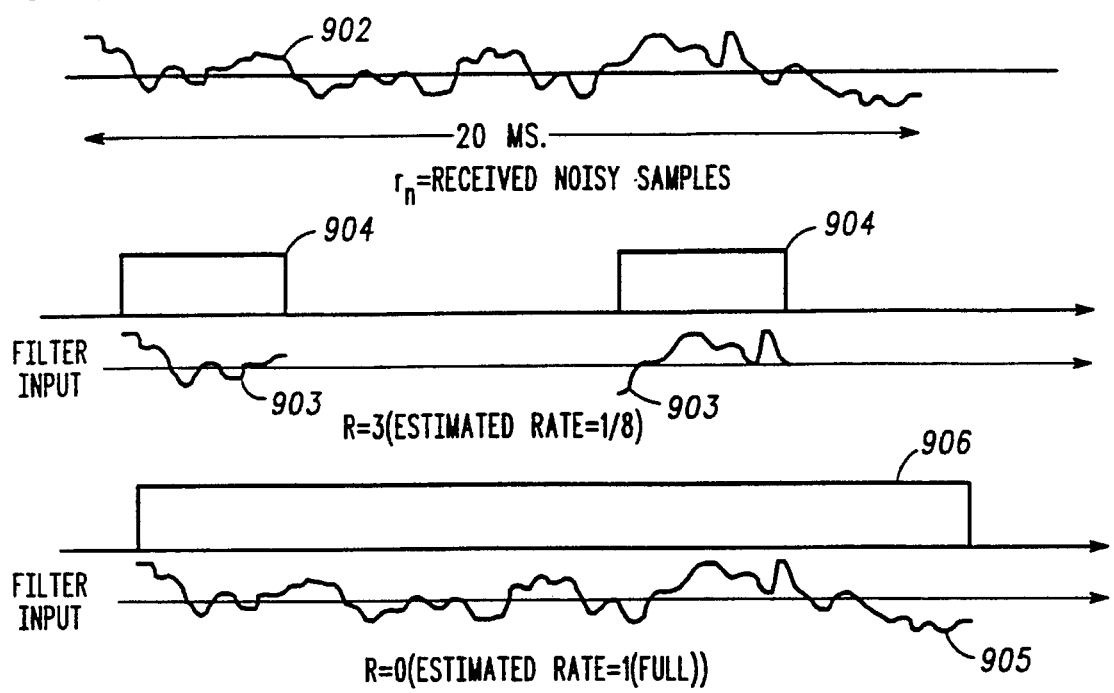
FIG. 11 illustrates a received signal and filtered segments thereof when using the rate estimation approach of FIG. 10.

The operation of the presently preferred embodiment of rate estimator 171 is further illustrated in FIGS. 9 through 11. FIG. 9 shows a logical block diagram, and FIG. 10 a flow chart, of the preferred approach for rate and channel estimation in the receiver of FIG. 4. The rate estimator 171 receives the noisy, faded reference samples 151 from demultiplexor 430 (which knows the despread sample positions with sufficient accuracy for demultiplexing the reference samples from the data samples) as they are extracted (steps 802–804). These reference samples 151 are buffered in buffer 705 of rate estimator 171 until all symbols of the frame have been received (e.g., 96 symbols at full rate); the reference symbol stream to timing control 176, frequency offset estimator 172 and channel estimator 154 are previously buffered (see, e.g., buffer 707 following demultiplexor 430, thereby buffering the unrotated demultiplexed reference samples until the appropriate sequence family can be fed to rotaters 433, 434, 436 and 437) so as to delay their processing until a rate estimate 173 is received. Since not all "symbols" received will correspond to transmitted symbols (e.g., at less than full rate only the envelope of the information-bearing power control groups is keyed on, so the remaining information is noise), the rate estimator 171 performs a quasi-coherent correlation of the received reference symbol stream in rate determiner 706 (which, in the preferred embodiment, is achieved by a properly programmed ASIC (application specific integrated circuit) or DSP (digital signal processor)). A quasi-coherent correlation is used since the channel is coherent for the duration of a power control group (i.e., at 100 km/hr and 900 MHz in a Rayleigh fading channel the channel is coherent for under 4 ms). The correlation is performed (step 812) against each of the possible transmit sequences, for example the full, half, quarter and eighth rate sequences discussed above. The sum of the squares of the partial inner product (denoted Mi) is preferably used, scaled by a factor $k_i$. $M_i$ may be determined according to the following:

$$M_i = \sum_{g=1}^{16} \left| \sum_{j=1}^{6} r_n s_{n,i}^* \right|^2 \qquad (\text{eq. 7})$$

where $r_n$ is a received reference symbol and $s_{n,i}$ is one of the possible sequences denoted $\{s_0\}, \{s_1\}, \{s_2\}, \{s_3\}$ for the full through eighth rates, respectively. In each of the 16 power control groups there will be 6 reference symbols, so the coherent correlation is done over the time span of each power control group. The partial correlation result is squared for each group and the sum of the squares over the 16 groups is determined. This is scaled by a factor $k_i$=1, 2, 4 or 8 for i=0, 1, 2 or 3. The index of the maximum of the scaled results is outputted as the rate estimate 173, or R. In the alternative, the reference sequences could be expanded to include other, e.g., power control, information from the transmitting subscriber. For example, for transmission of full, half and eighth rate, plus the 1 bit of power control information, 6 sequences $\{s_i\}$, i=0, . . . , 5 are used.

This method of rate estimation is much less complex, and more accurate at full rate, than the proposed technique for IS-95 uplink communications, which could have been applied to the IS-95-like radio described herein. In the proposed IS-95 technique rate determination is done by running a 256 state Viterbi decoder four times, once for each possible rate. The parity check words (CRC, or cyclic redundancy check, or other frame quality indicator) are then examined for each of the four decoded streams to see which indicates the most likely (i.e., error-free) rate. As a skilled artisan will appreciate, such a proposed approach is computationally more intensive and less accurate than the solution of the present invention. Simulations show that an energy based rate detector or exhaustive decoder methods falsely identify a full rate frame as subrate about 0.3 to 0.5% of the time, versus a falsing rate for the reference symbol based rate detector of less than 0.1%.

Following a determination of the rate estimate 171, this is inputted to each of the channel estimator 154, frequency offset estimator 172 and timing control 176 (steps 814–818). The rate estimate 171 is used to select the reference demodulating sequence (synch(I) and synch(Q) of FIG. 4, equivalent to {sR} of block 171 of FIG. 9, also equivalent to aref(n) of eq. 2), used in extractor 150 to rotate the demultiplexed reference symbols from DEMUX 430. After the rate estimate becomes available and the rotator inputs and channel estimator filter are selected, the rotator and filter operation may be done concurrently. That is, as each rotator sample becomes available, one channel estimation filter output is then calculated. The rate estimate 171 is used to control the selection of a filter to operate on the rotator outputs in the channel estimator 154. Where the rate estimate is R=0 (i.e., full rate), all symbols of the frame are input to a full rate filter 711. This is further illustrated in FIG. 11 by signal 905, showing only those reference symbols 905, from the signal stream 902, that are within the frame period 906 being operated on by the filter 711. The full rate filter output 712 is then outputted from the channel estimator 154 as the channel estimate 156. When the rate estimate is other than R=0 (e.g., 1, 2 or 3) the reference symbols 152 are fed into filter 714, with the output 715 then serving as channel estimate 156. The input to filter 714 (illustrated in FIG. 11) is limited to those reference symbols 903 within the energized power control group periods 904. While only two filters have been shown, a skilled artisan will appreciate that a different filter (or algorithm) may be used for each rate estimate 173. For instance, at half rate, some groupings of 2 and 3 consecutive energized power control groups will occur under randomization. In that case, a good channel estimation filter will give some nonzero weight to neighboring energized groups in producing a channel estimate for a given group in the frame. It should also be appreciated that the overall filtering function is nonlinear, since the reference symbols themselves are determining the filter transfer function.

The channel estimator filters 711, 714 serve to construct a channel estimate 156 from at least a portion of the received noisy, faded reference symbol stream. The channel varies a great deal over the duration of the frame, so the channel estimate is computed repeatedly; a sequence of channel estimates emerges at 156. For instance, the channel may be estimated such that there is an output once per power control group segment of the received frame, that is, 16 estimates per frame. These channel estimates are used by detector 160 to phase align all of the received data symbols 158 to a 0 phase reference over the span of the entire frame (step 820). In that way, they may be efficiently combined with distorted copies of the same sequence from other antennas or channel delays before being near-optimally decoded in the Viterbi decoder 182. Just as the decoder 182 performance is better if its input is coherent over the frame length, the channel estimation filter 711 or 714 produces a better channel estimate if its input is coherent over the entire span being considered. For example, consider a received frame which is full rate, meaning information energy is present in all 16 power control groups. The channel estimation filter 711 or 714 will reduce the noise in its output most (yielding the highest signal to noise ratio estimate) if it operates on a time span, $T_f$, of noisy, faded samples roughly equal to the channel coherence time, $T_c$. The channel estimator 154 is in a sense an application of the idea of "smoothing," not "filtering." The estimator 154 is estimating the channel at time $t_0$ and effectively has access to measurement data from $t=-\infty$ to $t=+\infty$. For the conditions of 100 km/hr and 900 MHz, $T_c$ is about 4 ms or 3 power control groups (at 1.25 ms per power control group). $T_c$ varies in an inverse proportion to vehicle speed. The signal to noise ratio of the estimate will be highest if $T_f$ is about equal to $T_c$ (the precise shape of the filter is readily derived from Weiner filter theory, if the fading and noise process statistics are known); the filter should operate over 3 power control groups.

This latter point is significant. If the filter 711 or 714 is always operated over 3 power control groups it will provide a very suboptimal channel estimate on subrate data, since pure noise will be regularly injected into the filter via the non-energized power control groups. The alternative under prior approaches, operating a filter designed for a subrate, is suboptimal when it turns out that the received frame was full rate (suboptimal because $T_f \ll T_c$). The present invention solves this problem by estimating the speech rate with high accuracy before the channel estimate is done. This allows the appropriate filter 711 or 714 to be implemented for the current frame, yielding the best channel estimate in the full rate case, and a good estimate in the subrate case. In an alternative embodiment, where the number of filters is expanded, each of the various subrate cases (e.g., half, quarter and eighth) are optimally filtered.

Similar to the channel estimator 154, the rate estimate 173 is used by timing control 176 to filter the energized power control groups and by frequency offset estimator 172 to mask out the non-energized groups (steps 814–816). Appropriately filtered, the timing control 176 computes the timing measure (i.e., difference) and adjusts the taps as described above based on the energized groups (step 808). Step 806 illustrates an approach in which the energy estimate, computed using the noisy reference bits, of the on-time branch may be computed once per power control group and used to set or clear the downlink power control bit (i.e., informing the mobile whether its power is too high or low). In addition, the rate information may be used to indicate which slots are unoccupied, for example as information to the Viterbi decoder 182 of where the noisy samples are, for use by a signal to noise ratio estimator in scaling the input to the decoder 182 during subrate frames.

Figure 12:
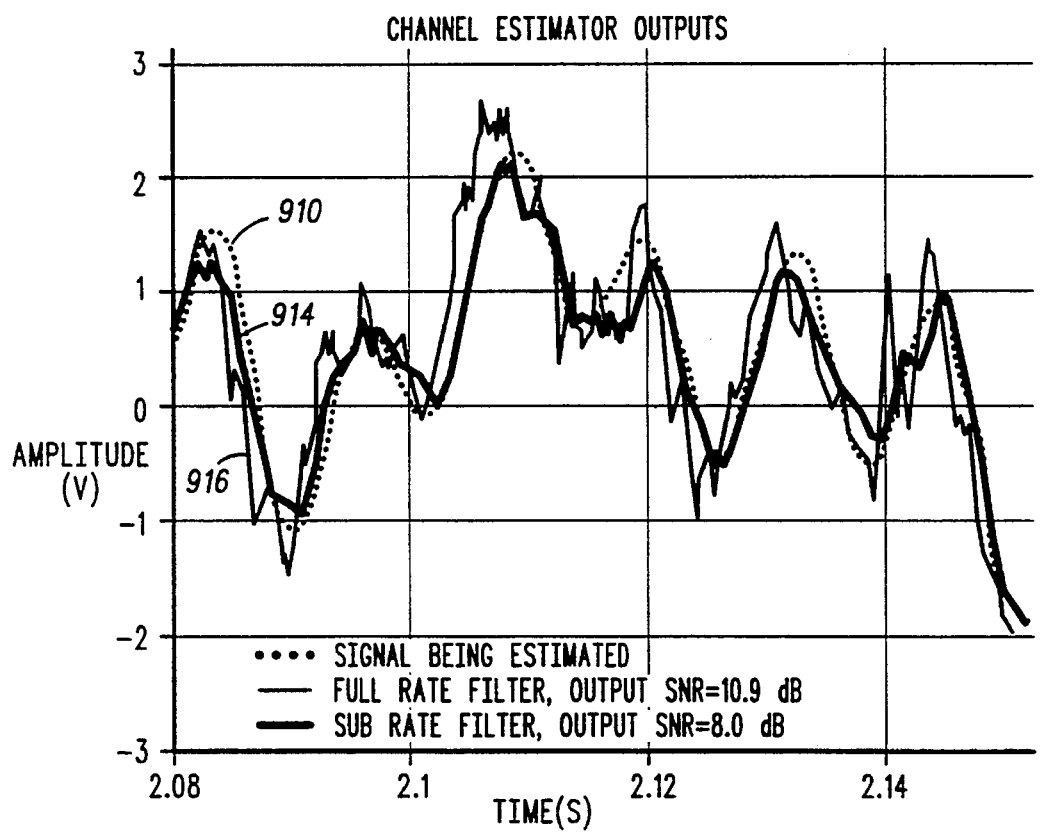
FIG. 12 is a chart illustrating a comparison of channel estimation outputs in the receiver shown in FIG. 1.
Figure 13:
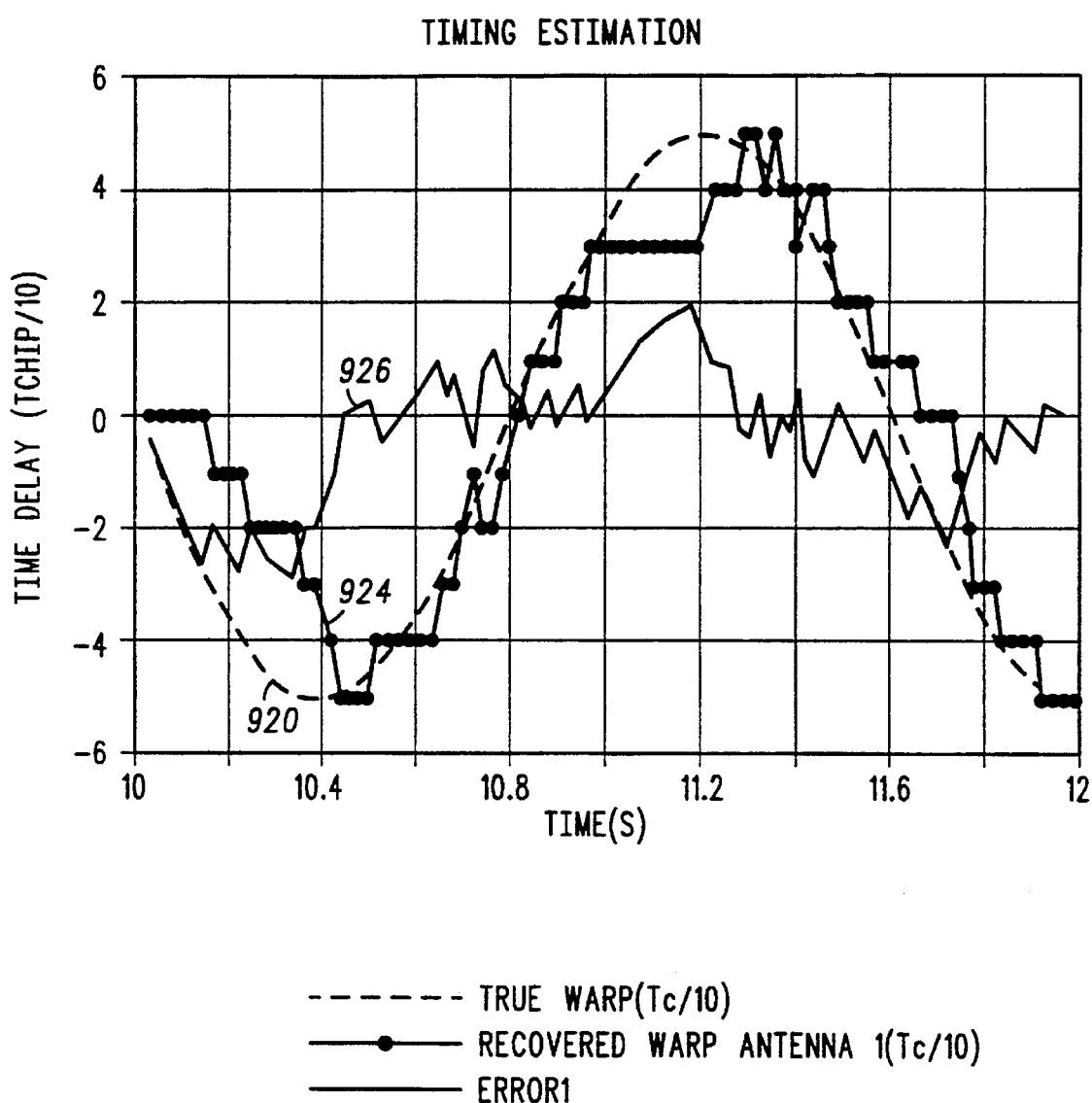
FIG. 13 is a chart illustrating a comparison of timing estimation outputs in the receiver shown in FIG. 1.

FIGS. 12 and 13 illustrate some of the benefits obtained by use of the rate estimate information. FIG. 12 illustrates the real outputs from channel estimator 154, where the signal to noise ratio (SNR) of the input signal 910 to filter is −0.5 dB. The subrate filter 714, in which $T_f \ll T_c$, yields a channel estimate 916 with calculated output SNR=8.0 dB. On the other hand, a full rate filter in which $T_f = T_c$ yields an improved channel estimate 914 with calculated SNR of 10.9 dB.

In the case of timing estimation, FIG. 13 illustrates how, if rate information is available, timing error can be tracked very well during full rate frames. Using the present invention, we use all 16 groups when all 16 are energized and only use 2 of the 16 when necessary (i.e., for eighth rate). In FIG. 13, the true channel timing 920 is simulated as slewing in a sinusoidal fashion, reaching peak values of one half chip period off of a mean value of 0. The timing circuit tracking is shown by the curve 924. The net error is shown by the third line 926. At between 10 and 10.2 seconds of elapsed time, the error is shown increasing to a value of 0.2 chip periods. During this time, almost all frames received were subrate, and timing updates were slow in coming. At about time 10.38 seconds, a burst of full rate frames began to be received. The rate estimator 171 detected that the frames were now full rate and allowed the timing circuit to operate on all received symbols. This led to rapid and correct timing corrections, bringing the timing error back to approximately 0.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the invention as claimed. For example, the modulator, antennas and demodulator portions of the preferred embodiment communication system as described were directed to CDMA spread-spectrum signals transmitted over a radio communication channel. However, as will be understood by those skilled in the art, the encoding and decoding techniques described and claimed herein can also be adapted for use in other types of transmission systems like those based on time division multiple access (TDMA) and frequency division multiple access (FDMA). In addition the communication channel could alternatively be an electronic data bus, wireline, optical fiber link, satellite link, or any other type of communication channel. Thus, it will be apparent to one skilled in the art that while the invention has been described in conjunction with specific embodiments thereof, it is evident that many alterations, modifications, and variations are possible in light of the foregoing description. Accordingly, the invention is intended to embrace all such alterations, modifications, and variations within the spirit and scope of the appended claims.

We claim:

1. A method of estimating transmission rate in a receiver including a sampler for digitizing a received spread spectrum signal including transmitted data, and a despreader following the sampler for despreading the received spread spectrum signal into a data signal, the method comprising the steps of:
   (a) extracting reference sample information from the data signal;
   (b) estimating by a rate estimator which slots of a first frame are occupied by the reference sample information; and
   (c) outputting a rate estimate based on the step of estimating.

2. The method of claim 1, wherein the reference sample information is plural reference samples, further comprising storing all reference samples of the first frame in a buffer of the rate estimator and outputting the stored reference samples on a slot by slot basis, and determining which slots are occupied.

3. The method of claim 2, wherein the step of determining which slots are occupied comprises determining which slots are occupied by a scaled sum of the partial inner product for each slot of all reference samples of said each slot correlated against each of a group of predetermined sequences.

4. The method of claim 1, further comprising:
   (c) determining a channel estimate by correlating the reference sample information with a known sequence determined by the rate estimate, and outputting a channel estimate.

5. The method of claim 1, further comprising:
   (c) determining a channel estimate by filtering the reference sample information with a predetermined one of plural filters based on the rate estimate, and outputting a channel estimate.

6. The method of claim 1, further comprising:
   (c) frequency offset adjusting one of a group consisting of the phase and frequency of the received spread spectrum signal based on the rate estimate.

7. The method of claim 1, further comprising:
   (c) adjusting the timing of the received spread spectrum signal based on both the rate estimate and at least one of the data signal and the reference sample information.

8. The method of claim 1, wherein the reference sample information includes a sequence selected from a reference sequence family defining an information message, and step (b) further comprises determining the sequence from the reference sample information.

9. The method of claim 8, wherein the information message is an indication of frame error rate observed at a transmitting unit from which the received spread spectrum signal was transmitted.

10. A coherent spread spectrum receiver, including a sampler for digitizing a received spread spectrum signal including transmitted data, and a despreader following the sampler for despreading the received spread spectrum signal into a data signal, the apparatus comprising:
    (a) extracting means coupled to the despreader for extracting reference sample information from the data signal;
    (b) rate estimator means coupled to the extracting means for estimating which slots of a first frame are occupied by the reference sample information; and
    (c) outputting means for outputting a rate estimate based on the estimating which slots of the first frame are occupied by the reference sample information.

11. The receiver of claim 10, wherein the reference sample information is plural reference samples and the rate estimator means comprises a buffer for storing all reference samples of the first frame and outputting the stored reference samples on a slot by slot basis, and a rate determining means for determining which slots are occupied.

12. The receiver of claim 11, wherein the rate determining means is further operable for determining which slots are occupied by a scaled sum of the partial inner product for said each slot of all reference samples of the slot correlated against each of a group of predetermined sequences.

13. The receiver of claim 10, further comprising:
    (c) channel estimator means coupled to the extracting means and rate estimator means for determining a channel estimate by correlating the reference sample information with a known sequence determined by the rate estimate, and outputting a channel estimate.

14. The receiver of claim 10, further comprising:
    (c) channel estimator means coupled to the extracting means and rate estimator means for determining a channel estimate, the channel estimator means comprising plural filter means for filtering the reference sample information with a predetermined one of the plural filters based on the rate estimate, and outputting a channel estimate.

15. The receiver of claim 10, further comprising:
    (c) frequency offset means coupled to the extracting means and rate estimator means for adjusting one of the group consisting of the phase and frequency of the received spread spectrum signal based on the rate estimate.

16. The receiver of claim 10, further comprising:

(c) timing control means coupled to the extracting means and rate estimator means for adjusting the timing of the received spread spectrum signal based on both the rate estimate and at least one of the data signal and the reference sample information.

17. A coherent spread spectrum receiver, including a sampler for digitizing a received spread spectrum signal including transmitted data, and a despreader following the sampler for despreading the received spread spectrum signal into a data signal, the receiver comprising:

(a) an extractor coupled to the despreader operable for extracting reference sample information from the data signal;

(b) a rate estimator coupled to the extractor, operable for estimating which slots of a first frame are occupied by the reference sample information; and (c) outputting means for outputting a rate estimate based on the estimating which slots of the first frame are occupied by the reference sample information.

* * * * *